(12) United States Patent
Musale

(10) Patent No.: US 7,674,382 B2
(45) Date of Patent: *Mar. 9, 2010

(54) METHOD OF CLEANING FOULED AND/OR SCALED MEMBRANES

(75) Inventor: Deepak A. Musale, Aurora, IL (US)

(73) Assignee: Nalco Company, Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/743,993

(22) Filed: May 3, 2007

(65) Prior Publication Data

US 2008/0271758 A1    Nov. 6, 2008

(51) Int. Cl.
*B01D 65/02* (2006.01)

(52) U.S. Cl. .................... 210/636; 134/22.19; 210/639; 210/698; 210/701; 210/732; 210/733; 210/774; 210/650

(58) Field of Classification Search .............. 134/3, 134/10, 19, 22.1, 22.19, 26, 28, 30, 41; 210/321.69, 210/636, 638, 639, 649–651, 696, 698–701, 210/732, 733, 774

See application file for complete search history.

(56) References Cited

U.S. PATENT DOCUMENTS

| | | | |
|---|---|---|---|
| 4,895,658 A | 1/1990 | Amjad | |
| 6,615,855 B2 * | 9/2003 | Lopez et al. | ............... 137/2 |
| 6,641,754 B2 * | 11/2003 | Buentello et al. | ............... 252/180 |
| 6,852,819 B2 * | 2/2005 | Ohnishi et al. | ............... 526/303.1 |
| 2005/0184008 A1 * | 8/2005 | Schacht et al. | ............... 210/636 |
| 2006/0122565 A1 * | 6/2006 | Kooi | ............... 604/246 |

FOREIGN PATENT DOCUMENTS

| | | |
|---|---|---|
| GB | 2 124 199 A | 2/1984 |
| JP | 2002346650 A2 | 12/2002 |
| WO | WO 99/15256 * | 4/1999 |
| WO | WO 03/057351 A | 7/2003 |
| WO | WO 2007/143448 A1 | 12/2007 |

OTHER PUBLICATIONS

International Search Report (2 pages), for Application PCT/US2008/062399, dated Jul. 2008.

\* cited by examiner

*Primary Examiner*—Joseph W. Drodge
(74) *Attorney, Agent, or Firm*—Peter A. DiMattia; Michael B. Martin

(57) ABSTRACT

A method of cleaning a fouled and/or scaled UF or MF membrane with a solution containing one or more thermoresponsive polymers is disclosed. More specifically, the method comprises: (a) treating the membrane in a membrane separation system with a solution containing one or more TRP, wherein said TRP is soluble in said solution and at least an effective amount of said TRP diffuses into a foulant layer that is present on the surface and/or in pores of said membrane; (b) making insoluble said TRP diffused into said foulant layer; (c) optionally rinsing the membrane; (d) optionally backwashing the membrane with air and/or liquid between the steps (b) and (c); and (e) optionally backwashing the membrane with air and/or liquid after the membrane is rinsed in step (c).

21 Claims, 2 Drawing Sheets

METHOD OF CLEANING FOULED AND/OR SCALED MEMBRANES

FIELD OF THE INVENTION

This invention pertains to a method of cleaning fouled and/or scaled ultrafiltration and microfiltration membranes using thermoresponsive polymers.

BACKGROUND

Ultrafiltration (UF) and microfiltration (MF) are increasingly being used for purification, concentration or fractionation of feed components in water and wastewater treatment, and in industrial processes. The benefits of membrane processes include lower energy requirement, much better product quality, smaller footprint and ease of operation. In addition to their well-established use in industrial separations, UF and MF processes serve as an excellent pre-treatment option for nanofiltration and reverse osmosis in water and wastewater treatment. However, these processes suffer from membrane fouling, which affects membrane performance negatively in terms of flux and separation characteristics, which in turn, results in higher capital and operating cost for a given through put and product quality. Membrane fouling could be of biological, colloidal, particulate or scaling in nature. Therefore, in addition to preventive measures, effective membrane cleaning is equally important for economic operation of UF and MF plants.

Membrane cleaning processes usually consist of removing the membrane system from service, rinsing the membrane system with high quality water, preparing a cleaning solution, heating the cleaning solution, circulating the cleaning solution at low pressure through the membranes and back into the clean-in-place (CIP) tank. The process may also include alternating periods of circulating the cleaning solution through the system and soaking the system in the cleaning solution. The system may also be rinsed and fresh cleaning solution applied as needed. Finally the system is rinsed with permeate quality water and either subjected to a second cleaning or placed back in service. In some of the hollow-fiber UF and MF membrane systems, backwashing with or without chemical is commonly practiced to control particulate and colloidal fouling. However, this method does not eliminate the thorough membrane cleaning procedure (CIP, clean-in-place) required to restore the membrane performance. Frequency of membrane cleaning as well as type of chemicals used in cleaning formulations can affect membrane life and therefore the operating cost. Therefore, improved cleaning methods and products are needed to restore the membrane performance (e.g. productivity and separation characteristics) and to extend the membrane life.

SUMMARY OF THE INVENTION

The present disclosure provides for method of cleaning a fouled and/or scaled UF or MF membrane in a membrane separation system comprising: (a) treating the membrane in a membrane separation system with a solution containing one or more TRP, wherein said TRP is soluble in said solution and at least an effective amount of said TRP diffuses into a foulant layer that is present on the surface and/or in the pores of said membrane; (b) making insoluble said TRP diffused into said foulant layer; (c) optionally, rinsing the membrane; (d) optionally backwashing the membrane with air and/or liquid between the steps (b) and (c); and (e) optionally backwashing the membrane with air and/or liquid after the membrane is rinsed in step (c).

The foulant layer could be organic and/or inorganic in nature.

DETAILED DESCRIPTION OF TH MENTION

Definitions of Terms:

"Thermoresponsive polymer" or "TRP" means a polymer that undergoes phase transition at a certain temperature called LCST. A more detailed description of TRP's can be found in U.S. Pat. No. 6,852,819, which is herein incorporated by reference.

"MM" means million.

"LCST" means lower critical solution temperature

"UF" means ultrafiltration.

"MF" means microfiltration.

"LMH" means liters per square meters per hour

"Soluble" means completely soluble or maximum swollen in solution below LCST of TRP.

"BW" means backwash

"CEB" means chemically enhanced backwash

Preferred Embodiments:

The scope of this invention is applicable to various types of water containing process systems. These water systems include, but are not limited to, wastewater systems, e.g. wastewater systems that utilize a membrane biological reactor, industrial water systems, and municipal water systems.

Treating the membrane with a TRP solution can occur via various mechanisms. Circulating a TRP containing solution in a membrane separation system or soaking a membrane in a membrane separation system are among several approaches to facilitating the transfer of TRP into a membrane.

In one embodiment, the membrane is treated with a solution containing TRP by circulating said solution in said membrane separation system.

In another embodiment, the membrane is treated with a solution containing TRP by soaking said membrane separation system with said solution.

In another embodiment, the membrane is treated with a solution containing TRP through a backwash, i.e. it is added from a permeate side to the feed side of membrane to remove foulants from the pores.

The LCST of said TRP solution may be adjusted by adding solvents, hydrotropes, salts, surfactants or combination thereof to the pure TRP solution, prior to treating the membrane surface.

Figure 1:
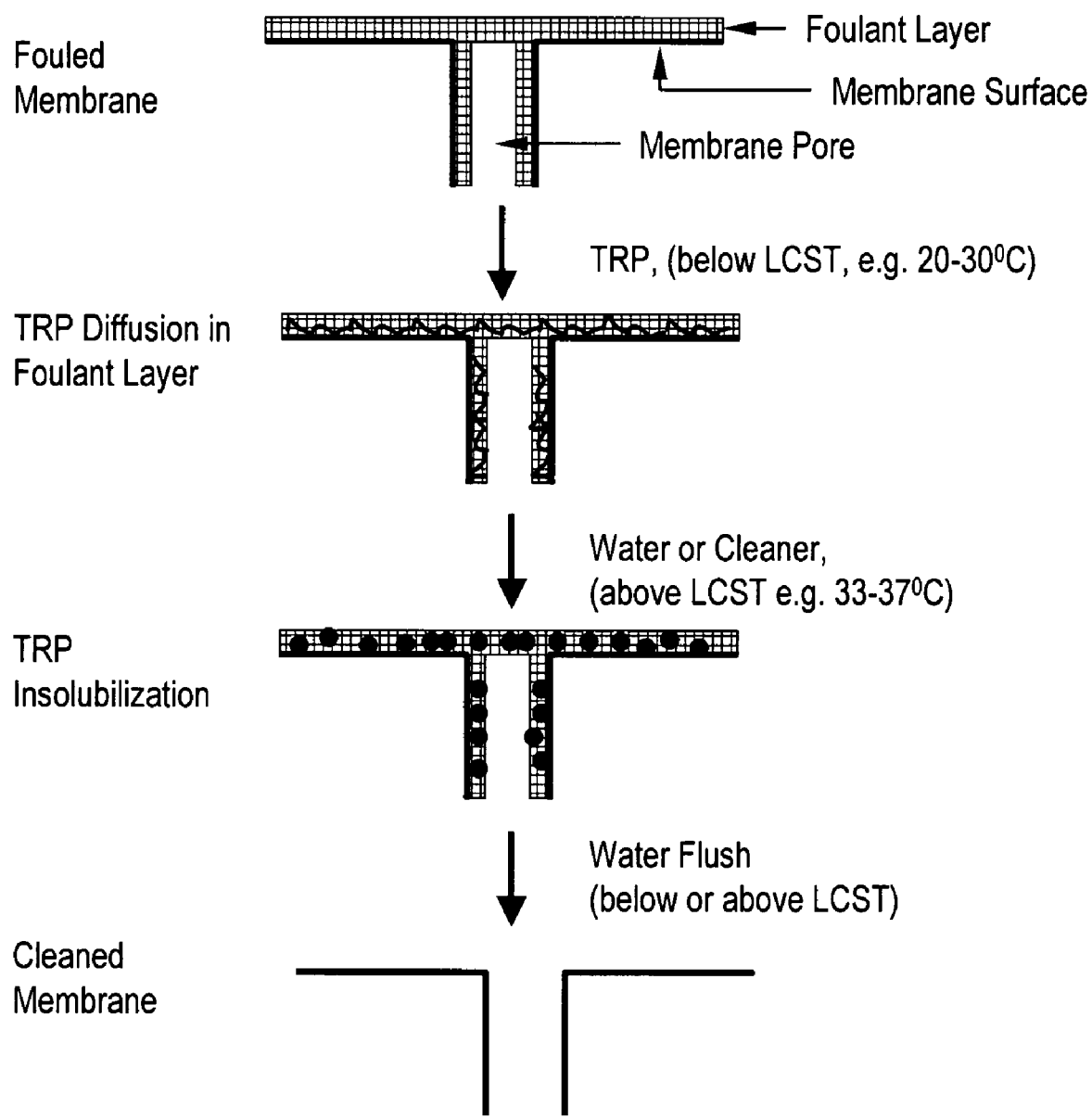
FIG. 1 shows a general schematic of how a TRP facilitates the removal of foulant that is located on a membrane surface and/or in pores of the membrane.

FIG. 1 shows a general schematic of how thermoresponsive polymers facilitate the removal of foulant that is located on a membrane surface and/or in the pores of a membrane. The membrane is first treated with TRP at a temperature below LCST, which makes it soluble in solution. The TRP, a portion or all of it, then diffuses into the foulant layer that is present on the surface and/or pores. TRP is then made insoluble by adding a solution, e.g. containing water or cleaner, under conditions so that the solution temperature is above LCST. When the TRP becomes insoluble the foulant layer is broken up or becomes structurally loose. Subsequently, the membrane may be rinsed so that residual TRP and foulant is removed from the membrane. The rinsing step may occur by flushing and/or back flushing the membrane under conditions below LCST.

Making the diffused TRP insoluble or soluble in solution can occur by altering the temperature of the solution.

In one embodiment, the TRP is made insoluble by raising the temperature of said solution above the LCST of said TRP. In a further embodiment, a cleaner is added to the solution before raising the temperature above LCST.

In another embodiment, the TRP is made insoluble by adding a subsequent solution that is above the LCST of said TRP.

In another embodiment, the TRP solution is made insoluble by back-flushing the membrane with water or a cleaner solution that is above LCST of said TRP.

In another embodiment, the TRP is made insoluble by a combination of circulating, soaking and back flushing a membrane with a cleaner solution that is above LCST of TRP. In a further embodiment, the steps of circulating, soaking and back flushing can occur wither sequentially or simultaneously.

Rinsing the membrane surface can occur via various routes known to those of ordinary skill in the art.

In one embodiment, the membrane is rinsed with a solution that contains water. In a further embodiment, the solution temperature is below the LCST of said TRP. In another embodiment, the solution temperature is above LCST of said TRP.

In another embodiment, the membrane is rinsed by back flushing with a solution that contains water. In a further embodiment, the solution temperature is below the LCST of said TRP.

In another embodiment, the membrane is rinsed by combination of flushing and back flushing the membrane system with a solution that contains water. In a further embodiment, the solution temperature is below the LCST of said TRP.

In another embodiment, membranes may be optionally backwashed with air and/or liquid between the steps of cleaner solution treatment above LCST and rinsing with solution below LCST.

In another embodiment, the membranes are optionally backwashed with air and/or liquid after rinsing, e.g. final rinsing, with solution below LCST.

The solution temperature may be altered via several different routes.

In one embodiment, a solution is circulated with the requisite temperature to alter the solubility of the TRP.

In another embodiment, a solution that is soaking the membrane may be heated by an external source.

In another embodiment, a solution with the requisite temperature is back-flushed to alter the solubility of the TRP.

Various types of TRP's are effective in facilitating the cleaning of UF and MF containing membranes.

In one embodiment, the TRP is poly(N-isopropyl acrylamide). Poly(N-isopropyl acrylamide) is a well known thermo-responsive polymer (TRP), which undergoes a phase transition at 32-33° C., i.e. it is soluble below this temperature and as this temperature approaches, polymer chains collapse and subsequently above this temperature, they aggregate and become insoluble.

In another embodiment, when the membrane is treated with a poly(N-isopropyl acrylamide) containing solution, the solution is at 25-30° C.

In another embodiment, the TRP is a homopolymer of a monomer having a formula $-CH_2=CR_1-CONR_2R_3$, wherein $R_1$=H or $C_1$-$C_4$ alkyl group and $R_2$ and $R_3$=H, $C_1$-$C_{18}$ linear, branched or cyclic alkyl group, or their conjugates with proteins or enzymes, wherein $R_2$ and $R_3$ can not be both H In another embodiment, the TRP is a co-polymer of one or more co-monomers having the formula $-CH_2=CR_1-CONR_2R_3$, wherein $R_1$=H or $C_1$-$C_4$ alkyl group and $R_2$ and $R_3$=H, $C_1$-$C_{18}$ linear, branched or cyclic alkyl group or fluorescent moiety such as pyrenyl, fluorenyl, naphthyl or dansyl or a combination thereof; or their conjugates with proteins or enzymes, wherein $R_2$ and $R_3$ can not be both H.

In another embodiment, the TRP is a co-polymer of one or more monomers having the formula $-CH_2=CR_1-CONR_2R_3$, where $R_1$=H or $C_1$-$C_4$ alkyl group and $R_2$ and $R_3$=H, $C_1$-$C_{18}$ linear, branched or cyclic alkyl group and wherein $R_2$ and $R_3$ can not be both H., with one or more co-monomers selected from vinyl pyrrolidone, acrylic acid (AA), methacrylic acid (MAA), itaconic acid, styrene sulfonic acid, vinyl sulfonic acid, isopropenyl phosphonic acid, vinyl phosphonic acid, vinylidene diphosphonic acid, hydroxyethyl methacrylate (HEMA), dimethylaminoethyl acrylate (DMAEA), dimethylaminoethylmethacrylate (DMAEM), glycidyl acrylate, glycidyl methacrylate, acrylylglycinamide, N-acryloylsuccinimide (NASI), 2-acrylamido 2-methylpropane sulfonic acid (AMPS), N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-methacrylamidopropyl-N-(3-sulfopropyl)-ammonium betaine (DMMAPSB), N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl)dimethylammonio] ethyl 2-methyl phosphate, 2-(acryloyloxyethyl)-2'-(trimethylammonium)ethyl phosphate, [(2-acryloylethyl)dimethylammonio]methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl)imidazolium hydroxide, (2-acryloxyethyl)carboxymethyl methylsulfonium chloride, 1-(3-sulfopropyl)-2-vinylpyridinium betaine, N-(4-sulfobutyl)-N-methyl-N,N-diallylamine ammonium betaine (MDABS), N,N-diallyl-N-methyl-N-2-sulfoethyl) ammonium betaine, acetone oxime acrylate, and a combination thereof.

In another embodiment, the TRP is selected from the group consisting of: polyethylene oxide (PEO), polypropylene glycol (PPG), poly[N-(2,2-dimethoxyethyl)-N-methylacrylamide], ethylene oxide (EO)-Propylene Oxide (PO) copolymer, polyvinylmethyl ether (PVME), poly(2-ethyl oxazoline) (PEOX), Hydroxypropyl cellulose (HPC), ethyl hydroxyethyl cellulose (EHEC), vinylalcohol-vinyl acetate copolymer, Poly(vinyl pyrrolidone), PVME-graft-PEO, elastin like polypeptides, and a combination thereof.

The amount of TRP added to the system depends upon the chemical and physical nature of the foulant layer, extent of fouling on the surface and in the pores of the membrane that is being cleaned, location of TRP injection before membrane system, a method of TRP injection (circulation, soaking, back-flushing etc), a combination of these factors, or other factors, which would be apparent to one of ordinary skill in the art.

In one embodiment, an effective amount of TRP is from about 1 ppm to about 5000 ppm, based upon active solids in the solution.

The molecular weight of the TRP may range from about 1,000 to about 20 MM daltons, preferably from about 1000 to about 100,000 daltons.

The treatment of a membrane with the TRP containing solution occurs for about 10 minutes to about 8 hours, preferably for about 10 minutes to about 120 minutes.

In another embodiment, the time between first backwash to treat membrane with TRP solution below LCST and another backwash with solution above LCST of TRP to make it insoluble, may be between 2 minutes to 180 minutes, preferably between 10 min to 60 minutes.

The methodology in the present disclosure may be applied to UF and MF membrane systems.

In one embodiment, the membrane is polymeric.

In another embodiment, the membrane is inorganic.

In another embodiment, the membrane is stainless steel.

In another embodiment, the membrane is selected from asymmetric or composite membranes.

In another embodiment, the membrane has hollow fiber (both outside-in and inside-out filtration type) configuration.

In another embodiment, the membrane has capillary configuration.

In another embodiment, the membrane has a flat sheet configuration.

In another embodiment, the membrane has a spiral wound configuration.

In another embodiment, the membrane has a tubular configuration.

In another embodiment, the membrane has multi-bore structure.

In another embodiment, the membrane is submerged in a feed solution tank.

In another embodiment, the membrane is external to the feed tank.

The cleaning process may be applied to various types of UF membranes.

In one embodiment, the UF membrane has a pore size of 0.003-0.1 μm.

The cleaning process may be applied to various types of MF membranes.

In one embodiment, the MF membrane has pore size of 0.1-10 μm.

This method of cleaning may be used as a partial or complete CIP (Clean-in-place) or may be combined with Chemically Enhanced Backwash (CEB) cycle.

In case of submerged membrane systems, this method of cleaning may be applied in the same tank as used for processing feed or the membrane may be transferred to another tank for cleaning.

In case of submerged membrane systems, membrane-scouring air may or may not be kept on during various steps of the cleaning process of this invention.

A cleaner may be added to a membrane separation system via various routes.

In one embodiment, the solution containing TRP contains a cleaner.

In another embodiment, a cleaner is added to the solution containing TRP.

In another embodiment, the membrane is treated with a solution containing cleaner.

Various types of cleaners may be utilized to a clean a membrane separation system.

In one embodiment, the cleaner contains water.

In another embodiment, the cleaner contains chlorine dioxide, chlorous acid, chloramines, sodium hypochlorite, bromine, bromous acid, sodium bromate, an oxyhalogen compound, or a combination thereof.

In another embodiment, the cleaner contains hydrogen peroxide, peracetic acid, sodium percarbonate, permanganates, or a combination thereof. In another embodiment, the cleaner contains cyclic nitroxyl compound such as 2,2,6,6-tetramethylpiperidine N-Oxyl (TEMPO) and oxyhalogen compound such as sodium hypochlorite. U.S. Pat. No. 7,052,557 provides a further description of this cleaner and is herein incorporated by reference. In a further embodiment, the nitroxyl compound is 2,2,6,6-tetramethylpiperidine N-Oxyl (TEMPO).

In another embodiment, the cleaner contains 2,2,6,6-tetramethylpiperidine N-Oxyl (TEMPO) and an oxyhalogen compound. In a further embodiment, the oxyhalogen compound is sodium hypochlorite.

In another embodiment, the cleaner contains anionic surfactants, non-ionic surfactants, cationic surfactants, zwitterionic surfactants, or a combination thereof.

In another embodiment, anionic surfactants are selected from the group consisting of: aliphatic organic phosphate esters; linear and branched alkylaryl sulfonates and derivatives thereof; linear and branched alkylaryl ether sulfonates and derivatives thereof; alpha olefin sulfonate; ammonium alcohol ethoxylate sulfate; ammonium alkyl ether sulfates; ammonium alkyl sulfates; alkyl sulfates; alcohol amine alkyl sulfates; alkyl sulfosuccinate salts; alkyl sulfonates and salts thereof; alkyl ether sulfonates and salts thereof; fatty alcohol ether sulfates; sulfates of alcohol; sulfonates of petroleum and petroleum derivatives; sulfonated oils and fatty acids; and a combination thereof.

In another embodiment, nonionic surfactants are selected from the group consisting of: alkanolamides; alkanol amide alkoxylates; alkoxylated alkyl amines; alkoxylated alkyl alcohols alkoxylated alcohols; alkyl glucosides; alkyl phenol alkoxylates; alkyl phenol alkoxylated alcohols; alkylated fatty acids; alkoxylated fatty alcohols; linear fatty alcohols, especially C16-C18; alkoxylated alkyl phenols; alkoxylated triglycerides; alkoxylated fatty acids; fatty acid amines; alkoxylated fatty esters and oils; polyol esters; polyoxyalkylene esters of fatty acids; alkyl polysaccharide ethers; aliphatic ethers; polyether glycols; sorbitan derivatives; block copolymers of propylene oxide and ethylene oxide; and a combination thereof.

In another embodiment, zwitterionic surfactants are selected from the group consisting of: alkyl ammonium carboxylates, alkyl ammonium sulphates, alkylammonium sulfonates, alkyl amine oxides, alkyl betaines, alkyl sulfobetaines, and a combination thereof.

In another embodiment, cationic surfactants are selected from the group consisting of: single or mixed alkyl substituted ammonium chlorides, single or mixed alkyl substituted ammonium acetates, single or mixed alkenyl substituted ammonium chlorides and acetates, mixed alkyl hydroxyalkyl amidoalkyl substituted ammonium chlorides and acetates, single and mixed alkyl imidazolium salts, and a combination thereof.

In another embodiment, the cleaner contains chelants and/or sequestering agents.

In another embodiment, the cleaner contains enzymes. In a further embodiment, one or more enzymes are selected from the group consisting of lipases; proteases; pectinases, cellulases, gluconases, galactosidases, and amylases.

The treatment of a membrane with a cleaner can occur via one or more routes. There are various approaches to membrane cleaning with one or more chemicals known to those of ordinary skill in the art and those approaches may be applied in the present methodology.

In one embodiment, a cleaner may be applied to a membrane in a membrane separation process by circulating a solution containing a cleaner through the membrane separation system, by soaking the membrane in a membrane separation system with a solution containing a cleaner, or by back-flushing the membrane in a membrane separation system with a solution containing cleaner and by a combination thereof.

How long a membrane is exposed to a solution containing a cleaner depends upon various factors known to those of ordinary skill in the art of cleaning membranes. Factors such as the physical and chemical composition of the membrane being cleaned as well as the type of foulants, if known, may be utilized in the analysis for determining how long to expose a membrane to a cleaner solution.

In one embodiment, the treatment of a membrane with the solution containing a cleaner occurs for about 10 minutes to about 8 hours.

In another embodiment, the treatment of a membrane with the solution containing a cleaner occurs for about 10 minutes to about 180 minutes.

In another embodiment, when TRP is poly(N-isopropyl acrylamide), the temperature of said solution at which TRP is made insoluble is 33-60° C.

EXAMPLES

Example 1

A spiral wound polysulfone UF membrane that was used in a food industry application and contained mainly organic foulants, was cut open to obtain a test coupons (0.00418 m² area). The cleaning performance was determined with the following test sequence. Test conditions for measurement of deionized ("DI") water flux permeate flow per unit time per unit membrane area) before and after cleaning were: 50 psi feed pressure, 25° C. temperature and approximately 200 revolutions per minute ("rpm") stirring speed in a dead-end filtration stirred cell. TRP was poly(N-isopropyl acrylamide). Permeate flow was measured by a weighing balance. A bucket and stopwatch could also be used.

One coupon (control) was cleaned by soaking in 1% alkaline cleaner D, pH 10.4 at 53° C. for 1 hr, whereas another coupon was cleaned by 1) first exposing it to 100 ppm TRP at 20 psi and 25° C. for 30 min and 2) then soaking it in 1% alkaline cleaner D, pH 10.4 at 53° C. for 30 min. Both coupons were rinsed and soaked in DI water (changed 3 times) for 60 minutes to remove residual cleaner and stabilize the membrane at ambient temperature, before measuring the DI water flux again. The DI water fluxes before and after cleaning by the above two methods are shown in FIG. 2.

Figure 2:
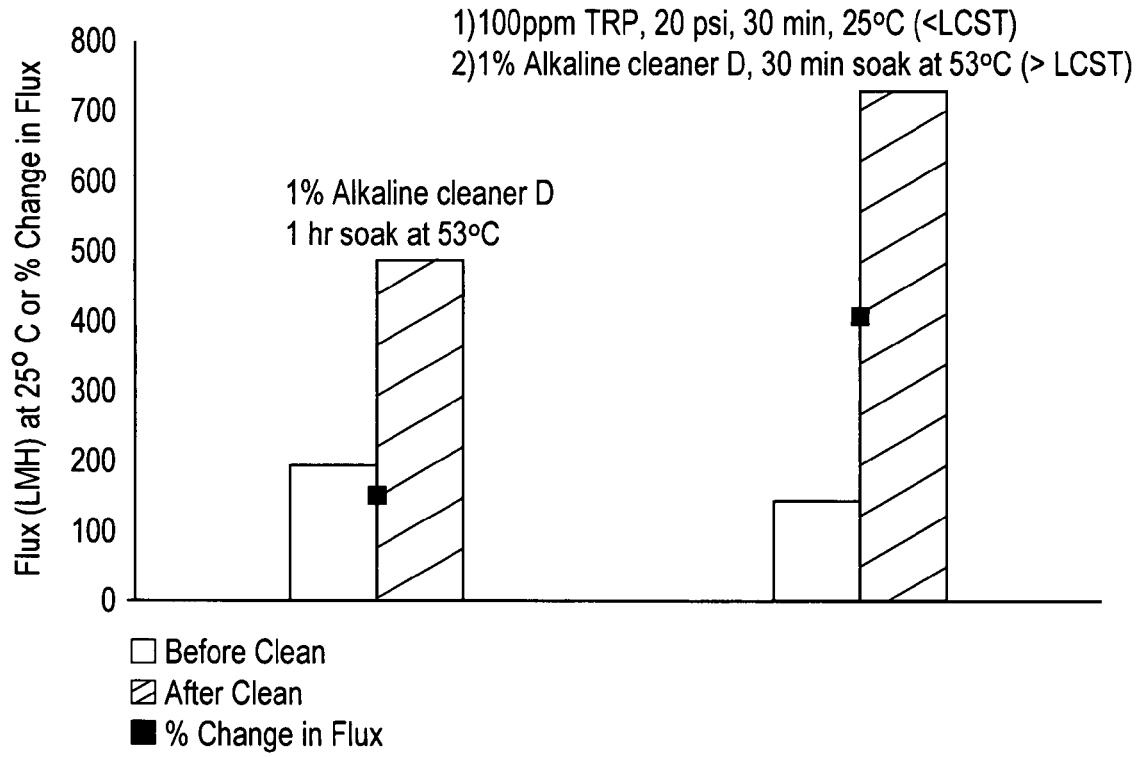
FIG. 2 shows a bar graph of deionized water flux through a membrane before treatment and after treatment with TRP.

It is apparent from FIG. 2 that after cleaning with alkaline cleaner alone, the DI water flux improved only 150%, whereas after cleaning with 100 ppm TRP (<LCST) followed by 1% alkaline cleaner (>LCST) resulted in over 400% increase in DI water flux.

Example 2

A spiral wound polysulfone UF membrane that was used in a food industry application and contained mainly organic foulants, was cut open to obtain a test coupons (0.00418 m² area). The cleaning performance was determined with the following test sequence. Test conditions for measurement of deionized ("DI") water flux (permeate flow per unit time per unit membrane area) before and after cleaning were: 50 psi feed pressure, 25° C. temperature and approximately 200 revolutions per minute ("rpm") stirring speed in a dead-end filtration stirred cell. TRP was poly(N-isopropyl acrylamide). Permeate flow was measured by a weighing balance. A bucket and stopwatch could also be used.

In this case, as opposed to Example 1, 100 ppm TRP and 1% alkaline cleaner were first mixed together. The membrane was then cleaned by exposing to this solution (pH 10.4) at 20 psi and 25° C. for 30 min, followed by soaking in the same solution at 53° C. for 30 min. The DI water flux results are shown in FIG. 3.

Figure 3:
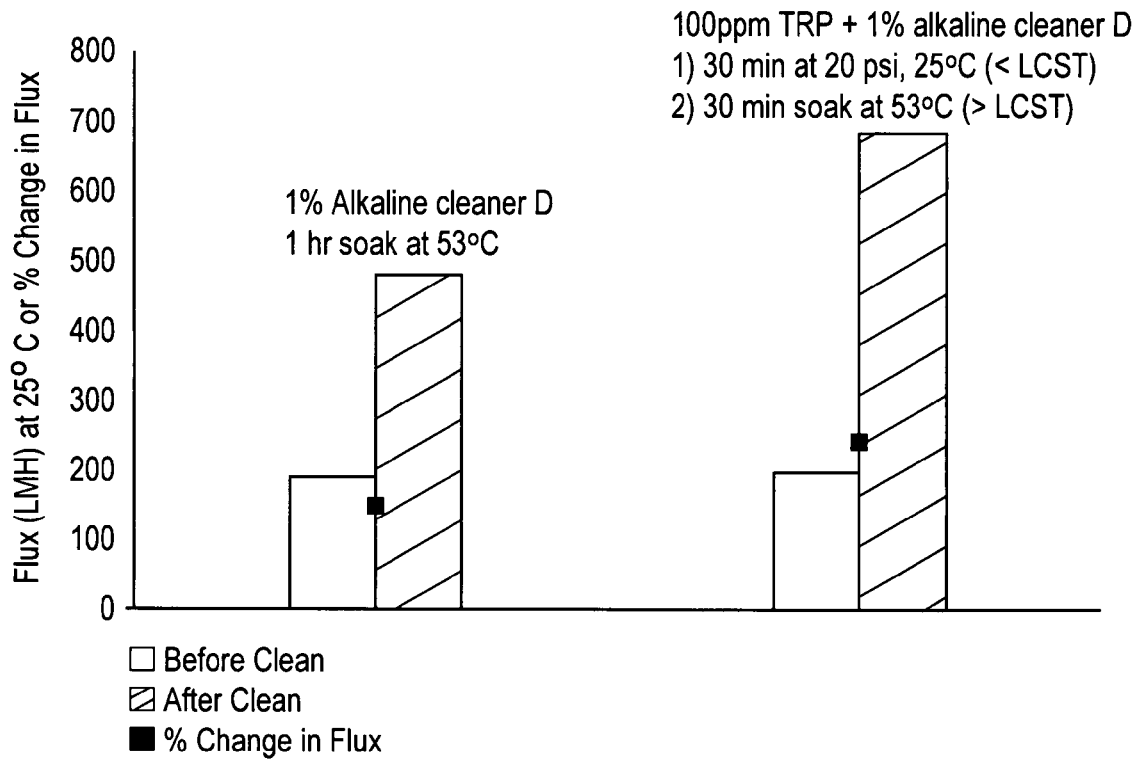
FIG. 3 shows a bar graph of deionized water flux through a membrane before treatment and after treatment with TRP.

As seen from FIG. 3, this method of cleaning also showed over 250% increase in flux compared to 150% with control (i.e. 1% alkaline cleaner D alone)

SUMMARY OF EXAMPLES

Thus both examples demonstrate the benefit of the method of this invention in terms of foulant removal and subsequent DI water flux improvement, indicating better cleaning by the method of this invention compared to alkaline cleaning alone that is commonly used in UF or MF process applications in food industries.

The invention claimed is:

1. A method of cleaning a fouled and/or scaled ultrafiltration(UF) or microfiltration(MF) membrane in a membrane separation system comprising:

(a) treating the membrane in a membrane separation system with a solution containing one or more thermo-responsive polymers (TRP), wherein said TRP is soluble in said solution and wherein said TRP is added to said membrane separation system in an effective amount so that TRP diffuses into a foulant layer that is present on the surface and/or in pores of said membrane in said membrane separation system, wherein said TRP is a co-polymer of one or more monomers having formula —$CH_2$=$CR_1$—$CONR_2R_3$, wherein $R_1$=H or $C_1$—$C_4$ alkyl group and $R_2$ and $R_3$=H, $C_1$—$C_{18}$ linear, branched or cyclic alkyl group and wherein $R_2$ and $R_3$ can not be both H, with one or more co-monomers selected from vinyl pyrrolidone, acrylic acid (AA), methacrylic acid (MAA), itaconic acid, styrene sulfonic acid, vinyl sulfonic acid, isopropenyl phosphonic acid, vinyl phosphonic acid, vinylidene diphosphonic acid, hydroxyethyl methacrylate (HEMA), dimethylaminoethyl acrylate (DMAEA), dimethylaminoethylmethacrylate (DMAEM), glycidyl acrylate, glycidyl methacrylate, acrylylglycinamide, N-acryloylsuccinimide (NASI), 2-acrylamido 2-methylpropane sulfonic acid (AMPS), N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-methacrylamidopropyl-N-(3-sulfopropyl)-ammonium betaine (DMMAPSB), N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl)dimethylammonio] ethyl 2-methyl phosphate, 2-(acryloyloxyethyl)-2'-(trimethylammonium)ethyl phosphate, [(2-acryloylethyl) dimethylammonio]methyl phosphonic acid, 2-methacryloyloxyethyl phosphorylcholine (MPC), 2-[(3-acrylamidopropyl)dimethylammonio]ethyl 2'-isopropyl phosphate (AAPI), 1-vinyl-3-(3-sulfopropyl)imidazolium hydroxide, (2-acryloxyethyl) carboxymethyl methylsulfonium chloride, 1-(3-sulfopropyl)-2-vinylpyridinium betaine, N-(4-sulfobutyl)-N- methyl-N, N-diallylamine ammonium betaine (MDABS), N,N-diallyl-N-methyl-N-(2-sulfoethyl) ammonium betaine, or wherein said TRP is a homopolymer of a monomer having a formula $-CH_2=CR_1-CONR_2R_3$, wherein $R_1$=H or $C_1$-$C_4$ alkyl group and $R_2$ and $R_3$=H, $C_1$-$C_{18}$ linear, branched or cyclic alkyl group, or their conjugates with proteins or enzymes, wherein $R_2$ and $R_3$ can not be both H or wherein said TRP is a co-polymer of one or more co-monomers having the formula $-CH_2=CR_1-CONR_2R_3$, wherein $R_1$=H or $C_1$-$C_4$ alkyl group and $R_2$ and $R_3$=, $C_1$-$C_{18}$ linear, branched or cyclic alkyl group or fluorescent moiety including pyrenyl, fluorenyl, naphthyl or dansyl, or a combination thereof, or their conjugates with proteins or enzymes, wherein $R_2$ and $R_3$ can not be both H;

(b) making the TRP that has diffused into said foulant layer insoluble in said membrane separation system;

(c) optionally rinsing the membrane;

(d) optionally backwashing the membrane with air and/or liquid between the steps (b) and (c); and (e) optionally backwashing the membrane with air and/or liquid after the membrane is rinsed in step (c).

2. The method of claim 1, wherein said membrane is treated with a solution containing TRP by circulating said solution in said membrane separation system.

3. The method of claim 1, wherein said membrane is treated with a solution containing TRP by soaking said membrane separation system with said solution.

4. The method of claim 1, wherein said membrane is treated with a solution containing TRP by back-flushing said solution in said membrane separation system.

5. The method of claim 1, wherein said TRP is made insoluble by raising the temperature of said solution above the lower critical solution temperature (LCST) of said TRP.

6. The method of claim 1, wherein said TRP is made insoluble by adding a subsequent solution that is at a temperature above the LCST of said TRP.

7. The method of claim 6, wherein said subsequent solution contains a cleaner.

8. The method of claim 7, wherein said cleaner contains chlorine dioxide, chlorous acid, chloramines, sodium hypochlorite, bromine, bromous acid, sodium bromate, an oxyhalogen compound, hydrogen peroxide, peracetic acid, sodium percarbonate, potassium permanganate, or a combination thereof.

9. The method of claim 7, wherein said cleaner contains one or more anionic surfactants; cationic surfactants; zwitterionic surfactants; non-ionic surfactants; or a combination thereof.

10. The method of claim 7, wherein the said cleaner is circulated in said membrane system that contains said membrane, soaked in said membrane system that contains said membrane, back-flushed through a said membrane or a combination thereof.

11. The method of claim 1, wherein said TRP is made insoluble by back flushing with a solution that is at a temperature above the LCST of TRP.

12. The method of claim 1, wherein said solution contains a cleaner.

13. The method of claim 12, wherein said cleaner is added to said solution before raising the temperature above LCST of said TRP.

14. The method of claim 12, wherein said cleaner contains (1) a cyclic nitroxyl compound and one of a peracid or hydroperoxide reoxidator, or (2) a nitroxonium compound.

15. The method of claim 14, wherein said nitroxyl compound is 2,2,6,6-tetramethylpiperidine N-Oxyl (TEMPO).

16. The method of claim of 12, wherein said cleaner contains 2,2,6,6-tetramethylpiperidine N-Oxyl (TEMPO) and an oxyhalogen compound.

17. The method of claim 16 wherein oxyhalogen compound is sodium hypochlorite.

18. The method of claim 1, wherein said TRP has a molecular weight of about 1,000 to about 20 MM daltons.

19. The method of claim 1, wherein said membrane is rinsed with a solution that contains water.

20. The method of claim 19, wherein said solution is at a temperature below the LCST of said TRP.

21. The method of claim 19, wherein said solution is at a temperature above the LCST of said TRP.

* * * * *